3,338,860
COATING COMPOSITIONS CONTAINING AN INTERPOLYMER HAVING REACTIVE HYDROXYBUTYL AND CARBOXYLIC ACID MOIETIES

Joseph A. Vasta, Sharon Hill, Pa., assignor to E. I. du Pont de Nemours and Company, Wilmington, Del., a corporation of Delaware
No Drawing. Filed June 29, 1962, Ser. No. 206,176
4 Claims. (Cl. 260—33.4)

This invention relates to novel copolymer compositions having in the copolymer structure pendant reactive hydroxybutyl and carboxylic acid moieties and to heat-curable coating compositions having such a reactive copolymer in combination with a heat-curable aminoplast condensate. More particularly, the invention relates to novel copolymers resulting from the esterification reaction of 1,2-butylene oxide with a preformed carboxylic acid copolymer product of single phase solution polymerization of a plurality of alpha mono-olefinically-unsaturated comonomers, the comonomer mixture being at least ternary in composition consisting essentially of (a) a monovinyl monocyclic aromatic hydrocarbon, (b) at least one neutral ester of acrylic acid or methacrylic acid, and (c) at least one alpha mono-olefinically-unsaturated carboxylic acid having one terminal methylene group per molecule, the resulting copolymer product having both pendant carboxylic acid moieties and pendant hydroxybutyl moieties which are ester-linked. The invention further relates to a novel process for preparing such reactive copolymers having these pendant carboxyl and hydroxybutyl moieties and to curable coating compositions formulated with these reactive copolymers.

It is known in the polymer art to prepare copolymers having pendant hydroxyalkyl groups by initiating with a comonomer having the hydroxyalkyl moiety. For example, U.S. Patent 2,681,897 discloses numerous reactive copolymers derived by solution copolymerization of a plurality of alpha monoolefinically-unsaturated monomers including a comonomer having a hydroxyalkyl moiety, especially comonomers having a beta hydroxyethyl moiety. U.S. Patent 2,819,237 discloses similar copolymers which are prepared in aqueous latex form by emulsion polymerization. These reference patents also disclose combinations of these copolymers having pendant hydroxyalkyl moieties with a thermosetting alkylated aminoplast resin or a thermosetting resin-forming reaction product. U.S. Patent 2,484,487 discloses the preparation of beta hydroxyethyl acrylate, beta hydroxyethyl methacrylate, beta hydroxypropyl acrylate and beta hydroxypropyl methacrylate monomers by reacting ethylene oxide or propylene oxide with the respective acids. U.S. Patent 3,002,959 relates to a one-step process of preparing copolymers having hydroxypropyl moieties by noncomitant reactions, through the combination of the three reactants, i.e., the copolymerizable alpha mono-olefinically-unsaturated carboxylic acid, the copolymerizable non-carboxylic comonomer, and the propylene oxide, and the use of two catalysts, i.e., a vinyl polymerization catalyst and a carboxy-epoxy catalyst.

Copolymers prepared according to the teachings of these reference patents having beta hydroxyethyl and beta hydroxypropyl pendant moieties, leave something to be desired when formulated as appliance enamels in combination with thermosetting aminoplast condensates. One of the disadvantages of these prior art copolymers is that when formulated as heat-curable coating compositions, they cannot be satisfactorily reoperated, i.e., the cured enamel cannot be satisfactorily recoated and reprocessed to eliminate imperfections in the original coat. To remedy imperfections in these prior art enamels, which recoating ordinarily would conceal, it is necessary to strip the imperfect enamel and start anew. Another disadvantage, particularly in reference to the product prepared by the concomitant reactions, is lack of adequate stability of the liquid compositions because of the presence of residual catalyst therein. Still another disadvantage is that they ordinarily require addition of a curing catalyst immediately prior to use to effect adequate heat-curing under ordinary baking conditions.

The primary objective of this invention is to provide copolymers having pendant hydroxybutyl moieties which copolymers in combination with a heat-curable aminoplast coating resin and epoxy condensate are package-stable in the liquid state and are reoperable with adequate adhesion in the cured state. A particular advantage is that the coatings can be adequately cured by heat alone without the aid of curing agents.

Copolymers which are contributory to achieving these advantageous objectives are prepared by initially preparing a parent carboxylic acid copolymer by single-phase solution copolymerization, partially esterifying carboxyl moieties of the resulting parent carboxylic acid copolymer by reaction with 1,2-butylene oxide in the presence of a quaternary ammonium hydroxide esterification catalyst, preferably in the further presence of a tri-organophosphite, e.g., triphenyl phosphite, and thereafter reacting the esterification catalyst with phosphoric acid and removing the esterification catalyst as a precipitated quaternary ammonium phosphate salt. The proportion of carboxyl moieties in the parent carboxylic acid copolymer and the proportion of 1,2-butylene oxide reacted therewith are sufficient to provide the resulting esterified copolymer having the pendant hydroxybutyl moieties with a content of 10 to 40% by weight of units of the hydroxybutyl ester and an acid number in the range of 5 to 30.

The parent esterifiable copolymer is prepared from a plurality of alpha mono-olefinically-unsaturated monomers, each having a terminal methylene group, at least ternary in composition, consisting essentially of (a) a monovinyl monocyclic aromatic hydrocarbon, e.g., styrene, vinyl toluene, and other alkyl ring-substituted vinyl benzenes, (b) at least one neutral ester of a $C_3$ to $C_4$ alpha mono-olefinically-unsaturated carboxylic acid having a terminal methylene group with a saturated aliphatic monohydric alcohol, usually $C_1$ to $C_{18}$, composed of carbon, hydrogen and oxygen atoms, e.g., neutral esters of acrylic acid and methacrylic acid and preferably lower alkyl esters of these acids of which the alkyl group is $C_1$ to $C_6$, and (c) at least one alpha mono-olefinically-unsaturated carboxylic acid having one terminal methylene group per molecule, preferably having one to two carboxyl moieties and 3 to 5 carbon atoms per molecule, e.g., methacrylic acid, acrylic acid and itaconic acid. The monocarboxylic acid species are especially preferred.

In formulating a coating composition of these 1,2-butylene oxide esterified carboxylic acid copolymers, a solution of the copolymer in a solvent therefor is blended in the proportions of: (I) 50 to 80 parts of the esterified copolymer, (II) 3 to 30 parts of a water-insoluble epoxy-hydroxy polyether condensate having a plurality of vic-epoxy groups per molecule, preferably an average of more than one and up to two vic-epoxy groups, and at least one hydroxyl joined to an aliphatic carbon atom, and (III) 10 to 50 parts of at least one heat-curable aminoplast coating resin which is a condensate of formaldehyde with at least one member of the group consisting of melamine, benzoquanamine, melamine in combination with toluenesulfonamide, and urea, the condensate preferably being etherified with a saturated aliphatic monohydric alcohol, to provide a total of 100 parts of these essential organic film-forming materials which are compatibly in solution in a mutual solvent therefor. Pigment is dispersed in this solution in the proportion of up to about 150 parts per 100 parts of the organic film-forming material to provide a pigmented enamel composition.

Although the neutral and non-reactive units of the parent carboxylic acid copolymer can be varied extensively, useful parent copolymers preferably have a content of such polymerized units derived from the defined (a) vinyl aromatic hydrocarbon comonomer sufficient to provide the resulting esterified copolymer per 100 parts by weight thereof, with about 15 to 50 parts, preferably 20 to 45 parts, of the (a) units. On the same basis, the parent copolymer provides the esterified copolymer with about 10 to 70 parts, preferably 20 to 60 parts, of the neutral ester units of (b). As indicated hereinbefore, the resulting esterified copolymer is characterized by an acid number desirably in the range of 5 to 30, preferably 10 to 20. Approximately 0.75% by weight of unesterified units from methacrylic acid provide the minimum acid number of 5 and approximately 4.6% of unesterified units from methacrylic acid provide the maximum of acid number of 30. As indicated, useful esterified copolymers have a content of the hydroxybutyl ester units in the range of about 10% to 40%, preferably 15% to 30%. Per 100 parts of hydroxybutyl methacrylate units, about 55 parts thereof are the contribution of the methacrylic acid and 45 parts thereof are the contribution of the 1,2-butylene oxide. At the minimum content of 10% of this ester, the minimum contribution of the methacrylic acid is about 5.5%. Thus, the parent carboxylic acid copolymer must provide at least this proportion of the methacrylic acid plus an addition proportion sufficient to provide the minimum acid number of 5 in the esterified copolymer. For example, in the preparation of 1000 parts of the esterified copolymer having a content of 15% of units of the hydroxybutyl methacrylate and an acid number of about 10, about 68.5 parts of 1,2-butylene oxide are reacted with 931.5 parts of the parent carboxylic acid copolymer having a content of about 10.4% of polymerized methacrylic acid units, i.e., about 96.9 parts sufficient to supply 81.5 parts for esterification by the 1,2-butylene oxide and about 15.4 parts excess to provide the acid number of about 10. At an acid number of 30, the parent copolymer must provide 81.5 parts of these acid units for esterification and an excess of about 46 parts to satisfy the acid number, the total being about 12.75% of the parent polymer. At this maximum acid number and a maximum content of 40% hydroxybutyl methacrylate, the parent copolymer must contain about 32.3% by weight of polymerized methacrylic acid units. About 818 parts of this parent copolymer provide about 264 parts of these acid units of which 218 parts are required for esterification with 182 parts of 1,2-butylene oxide and 46 parts excess unesterified acid units provide the acid number. In preparation of the esterified copolymer having the minimum 10% of hydroxybutyl methacrylate and minimum acid number of 5, the parent copolymer must have a content of about 6.5% of polymerized methacrylic acid units of which 0.8% remain unesterified, i.e., about 88 parts per 100 parts of the methacrylic acid units in the parent copolymer are esterified. In preparing the esterified copolymer having a maximum acid number 30 and minimum esterification, about 55 parts per 100 parts of the methacrylic acid units of the parent copolymer are esterified. When acrylic acid is used in lieu of methacrylic acid, from about 56 to 97 parts per 100 parts of the polymerized acrylic acid units of the parent copolymer are esterified with 1,2-butylene oxide in providing the indicated respective ranges of acid number and hydroxybutyl ester content. When dicarboxylic itaconic acid is used in lieu of methacrylic acid, from about 58 to about 97 parts per 100 parts of the polymerized itaconic acid units in the parent copolymer are esterified with 1,2-butylene oxide in providing the indicated respective ranges of acid number and hydroxybutyl ester content.

Although the 1,2-butylene oxide may esterify from about 55 to about 97 parts per 100 parts by weight of the polymerized carboxylic acid units in the parent copolymer, preferably the parent carboxylic acid copolymer has a content of the respective carboxylic acid units such that esterification in the range of about 65 parts to 90 parts per 100 parts of these carboxylic acid units provides the esterified copolymer with the respective specified ranges of hydroxybutyl ester and acid number.

One esterification equivalent weight of 1,2-butylene oxide, i.e. about 72 grams, requires one mole of acrylic acid, i.e. about 72 grams, one mole of methacrylic acid, i.e. about 86 grams, or ½ mole of itaconic acid, i.e. about 65 grams. Thus, 100 grams of the esterified copolymer contains the following gram equivalents of the respective hydroxybutyl esters:

|  | 10% Level | 40% Level |
|---|---|---|
| Hydroxybutyl acrylate | 0.070 | 0.280 |
| Hydroxybutyl methacrylate | 0.064 | 0.256 |
| Hydroxybutyl itaconate | 0.073 | 0.292 |

Acid esters of itaconic acid can be used in lieu of the dicarboxylic itaconic acid to provide the parent copolymer with carboxylic acid moieties for subsequent esterification with the 1,2-butylene oxide, the alcohol esterifying the itaconic acid to the acid ester thereof preferably being a $C_1$ to $C_4$ alkanol.

Preparation of the parent carboxylic acid copolymer by single-phase solution polymerization can be accomplished by any of the techniques recognized by those skilled in the polymerization art. Although any inert organic liquid medium which comprises a solvent for the comonomers and the resulting copolymer and which is non-reactive therewith can be used as the polymerization medium. The medium preferably comprises an aromatic hydrocarbon solvent or high solvency petroleum naphtha and a polar solvent such as an alcohol. The solvent is usually so selected that the polymerization can be conveniently carried out at reflux temperature. Typical useful hydrocarbon solvents include toluol, toluol substitutes, xylol, xylol substitutes, and high solvency hydrocarbons which have a boiling range preferably within the temperature range of about 95° C. to about 200° C. and a low aniline point, preferably below 0° C. "Solvesso" 100 characterized by a boiling range of 150° to 190° C. and an aniline point of −28° C. is typical of particularly preferred high solvency petroleum hydrocarbons. Solvency of the polymerization medium can be enhanced by the presence of polar solvents in combination with the hydrocarbon solvent, e.g., alcohols such as butanol, isobutanol, propanol, isopropanol and ethyl, methyl or butyl monoethers of ethylene glycol, i.e. the "Cellosolve." The hydrocarbon polymerization medium may contain from 5 to 50% by weight of the modifying monohydric alcohol. The volatile liquid portion of the completed liquid coating composition usually includes one or more of the alcohols in combination with the hydrocarbon and it is usually advantageous to include the alcohol in the polymerization medium.

Any free radical-generating vinyl polymerization promoter which is soluble in the polymerization medium and is adequately activated at an elevated temperature up to reflux temperature of the polymerization medium can be used. Organic peroxides are preferred as the polymerization promoter, e.g., tertiary butyl peracetate, benzoyl peroxide, and cumene peroxide. The polymerization promoter is used in ordinary proportions and is preferably premixed with the comonomers prior to introduction into the polymerization medium, although it can be introduced separately. The comonomers can be introduced separately or as a mixture thereof. Although any of the usual procedures for solution polymerization can be used, the mixture of comonomers including the promoters is preferably added to the liquid polymerization medium at a uniform rate over a period of several hours, usually two to six hours, with the medium maintained at about reflux temperature, followed by maintenance of the polymerization conditions for several hours after addition of the comonomers is completed. Polymerization is carried out under conditions by which the resulting copolymer is characterized by a relative viscosity usually in the range of from about 1.05 to about 1.30, preferably 1.10 to 1.25, based on a solution of 0.50 gram of copolymer in 50 ml. of ethylene dichloride. Still higher viscosity copolymers can be used but they reflect a lower content of film-forming material at ordinary application viscosity.

The relative proportion of comonomers to the polymerization medium is such that the copolymer content of the solution product of the polymerization recipe is usually in the range of 20% to 65% by weight, preferably 30% to 55%. The proportion of comonomers can constitute a still lower proportion, e.g. as low as 10%, of the polymerization recipe, but it is usually more economical to polymerize at a higher monomer concentration.

The respective comonomers can be of ordinary commercial quality containing usual proportions of polymerization inhibitor and they can be used without removal of the inhibitor or without other refinement or purification. Typical inhibitors found in polymerizable monomers include hydroquinone, p-tertiary butyl catechol and methyl ether of hydroquinone. The relative proportion of inhibitor usually varies with the respective monomers and it is preferred that the proportion of inhibitor based on the total comonomer composition is not significantly in excess of 100 p.p.m.

The resulting solution of reactive copolymer is reacted with 1,2-butylene oxide to effect partial esterification of the polymerized carboxylic acid units thereof. The esterification preferably is carried out in the same polymerization equipment consecutive to the polymerization reaction without isolation of the parent copolymer. However, the process can be interrupted on completion of the polymerization and esterification initiated later. The 1,2-butylene oxide, also known as 1,2-epoxybutane, is added to the solution of the resulting copolymer usually at a temperature just below reflux which varies with the selected solvent medium. The 1,2-butylene oxide preferably is added as a preformed solution in hydrocarbon solvent which may be of the same characteristics as used in the polymerization medium. This solution preferably further includes a neutral phosphite ester, e.g. triphenyl phosphite, trioctyl phosphite, trinonyl phosphite and triphosphites having a combination of aryl and alkyl substituents. Presence of the phosphite is not essential to the esterification, but it provides a significant advantage in color quality to the resulting product. This advantage is important in formulating white coatings such as used for coating appliances. Where color quality is not of great significance, the phosphite may be omitted. The proportion of the phosphite usually is in the range of 0.5% to 2% based on the copolymer content.

The 1,2-butylene oxide is uniformly distributed in the copolymer solution and an esterification catalysts is introduced to initiate reaction between the carboxyl moieties and the 1,2-butylene oxide. Although any of the usual esterification catalysts can be used, a distinct advantage resides in the use of a specific class of esterification catalysts, i.e., quaternary ammonium hydroxides which yield acid phosphate salts on reaction with phosphoric acids which are insoluble in the solution of the esterified copolymer. Insolubility of the acid phosphate salt provides an opportunity for substantially complete removal of the esterification catalyst as a precipitated salt by filtration subsequent to completion of the esterification reaction to the desired level. Benzyltrialkylammonium hydroxides are preferred esterification catalysts, especially benzyltrimethylammonium hydroxide. In effecting precipitation of the quaternary ammonium hydroxide as a phosphate salt, an equimolar proportion of ortho phosphoric acid is used.

After addition of the esterification catalyst to the solution of esterifiable components, the temperature is preferably increased to reflux temperature and heating is continued until the desired level of esterification is achieved as followed by a reduction in acid number from the original value, the final acid number being in the range of 5 to 30. The proportion of 1,2-butylene oxide in the recipe may exceed that required to fully esterify the carboxylic acid moieties of the copolymer, but the esterification reaction is controlled to provide the resulting esterified copolymer with a carboxyl acid number of at least 5, preferably at least 10.

When the desired level of esterification is achieved, the resulting solution of ester product is treated with the phosphoric acid at about reflux temperature to effect precipitation of the quaternary ammonium hydroxide esterification catalyst as a phosphate salt. Heating is continued at reflux temperature to distill off unreacted 1,2-butylene oxide in excess of that esterified with the carboxylic acid moieties. This solution product is then cooled and filtered to remove to precipitated esterification catalyst. Sometimes it is desirable to provide the esterified copolymer solution at a copolymer content lower than that existing at completion of the esterification stage and to achieve this objective, solvents and/or diluents may be blended into the solution product before or after filtration. This dilution of the product solution is usually accomplished while the charge is still at an elevated temperature below reflux and prior to filtration. The final product preferably has a content of film-forming material in the range of 30 to 55%, this solution having a viscosity usually not exceeding about Z, on the Gardner-Holdt scale at 25° C.

While the esterified copolymer having the pendant carboxylic acid moieties and hydroxybutyl moieties can be used per se as a coating material for some purposes, the performance requirements imposed on coatings used for finishing appliances such as washing machines, dryers, refrigerators, freezers, cabinets and the like, necessitates compounding the reactive copolymer with film-forming materials reactive with the pendant moieties of the reactive copolymer to provide more resistant coatings which better satisfy the requirements for the contemplated utility. In achieving this objective, the solution of esterified copolymer is blended in suitable proportions with an epoxyhydroxy polyether condensate having a plurality of vic-epoxy groups per molecule and with at least one heat-curable aminoplast coating resin which is a condensate of formaldehyde with melamine, benzoguanamine, melamine with toluenesulfonamide, and urea, the hydroxymethyl moieties of such condensates usually being etherified at least in part with a lower saturated aliphatic monohydric alcohol, e.g. $C_1$ to $C_4$ alkanols.

These useful aminoplast coating resins are commercially available and readily recognized by those skilled in the art of coating formulation. Useful aminoplast coating resins based on aminotriazines such as melamine and benzoguanamine can be prepared following the teachings of U.S. Patent 2,197,357. Useful toluenesulfonamide-modified melamine/formaldehyde resins can be prepared following the teachings of U.S. Patent 2,508,875. Useful alkanol-modified urea/formaldehyde resin can be prepared following the teachings of U.S. Patent 2,191,957. While urea/formaldehyde coating resins can be used as the sole aminoplast component of the invention coating compositions for some purposes, use of this class of aminoplast is usually limited to no more than one-half the total content of the aminoplast component because a proportion in excess of this amount ordinarily does not provide an adequate balance of properties in appliance coatings. Use of the urea/formaldehyde coating resins is limited preferably to combinations including the aminotriazine aminoplast coating resins. The toluene-sulfonamide-modified melamine/formaldehyde resin is particularly preferred as the aminoplast component. These coating resins are usually supplied at 40 to 70% concentration in solution in a lower alkanol or a mixture thereof with a high solvency hydrocarbon, xylol or toluol.

Useful proportions of the heat-curable aminoplast coating resin are within the range of 10 to 50 parts, preferably 15 to 30 parts, based on 100 parts by weight of the essential organic film-forming materials.

Useful epoxyhydroxy polyether condensates have a plurality of vic-epoxy moieties, preferably about two, plus at least one hydroxyl moiety per molecule. These epoxy condensates are the product of essentially condensing a polyhydric component with an epihalohydrin, e.g. epichlorohydrin. A particularly useful class of these condensates is the product of condensing a dihydric phenol, e.g., diphenylolpropane, with epichlorohydrin under alkaline conditions. These condensates are commercially available as "Epon" resins. Useful resins of this class can be prepared in accordance with well known methods such as disclosed in U.S. Patents 2,503,726, 2,582,985, 2,592,560 and 2,694,694.

Preferred epoxy condensates are characterized by the general formula:

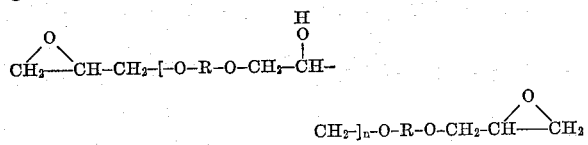

wherein: $n$ is an integer having a value of at least 1 and usually ranging up to about 20 and the moiety

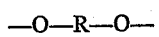

is identified as:

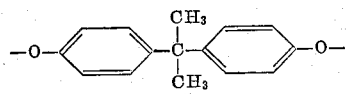

i.e., diphenylolpropane minus the hydrogen atoms of the phenolic hydroxyls. Thus, the preferred condensates contain two vic-epoxy moieties, i.e., 1,2-oxirane moieties, per molecule and at least one hydroxyl moiety joined to an aliphatic carbon atom. "Epon" 1001, "Epon" 1004, "Epon" 1007 and "Epon" 864 are typical useful, commercially available epoxy resins of this classification. In other useful epoxy condensates the radical —R— may be a monocyclic aromatic hydrocarbon radical or even an aliphatic hydrocarbon radical in lieu of the indicated bicyclic radical —R—.

Useful proportions of the vic-epoxy condensate usually range from 3 to 30 parts, preferably 5 to 20 parts, based on 100 parts by weight of the essential organic film-forming materials.

These epoxy condensates having a plurality of vic-epoxy moieties may be supplemented with ester products thereof such as described in U.S. Patent 2,456,408 and with epoxidized oils such as prepared according to the teachings of U.S. Patent 2,569,502. These supplemental epoxy materials, when present, usually constitute a minor proportion of the total content of epoxy components. It is desirable that at least 3 parts of epoxy condensate having at least two vic-epoxy materials per molecule be present per 100 parts of the essential organic film-forming materials.

Still other ancillary organic film-forming materials may be included in combination with the indicated essential components in their usual effective proportions, such proportion ordinarily being less than 10 parts per 100 parts of the essential components. The coating compositions may also contain organic siloxane polymer to improve the application properties and waxes to provide the cured finish with improved abrasion resistance.

The liquid medium used in the solution polymerization of the comonomers usually is an adequate solvent for the epoxy condensate and the aminoplast coating resin. Other compatible solvents and diluents may supplement the solvents and diluents which are supplied to the liquid coating composition by polymerization medium. These supplemental solvents and diluents can be any of those ordinarily used in coating formulations, these volatile liquids usually having a boiling range with the temperature limits of from about 80° C. to about 200° C. These may include hydrocarbons of high solvency, alcohols, esters, ketones, and ethers. These liquids may contain water in amounts corresponding to that of commercial dry organic liquids. The presence of absence of ordinary amounts of water is not a critical factor, but the proportion of water should be sufficiently low to avoid incompatibility.

The volatile liquid portion of the coating composition can be from 25% to 90% by weight thereof, i.e., the non-volatile coating components can range from 0% to 75%. The non-volatile content at ordinary packaging viscosity is usually in the range of 25% to 65%. At application viscosity suitable for spraying and roller-coating, the non-volatile content is ordinarily in the range of 10% to 55%, preferably 20% to 50%.

Any of the pigments ordinarily used in coating formulations can be used and they can be dispersed in the solution of the film-forming components by techniques well known in the art. Use of reactive pigments or other reactive or unstable coloring materials is avoided ordinarily because of the reactive groups in the film-forming components. For the primary utility of the coatings as appliance finishes, the principal pigment is titanium dioxide which may be in combination with other pigments to provide the desired tints.

The proportion of pigment is not critical and may range in some instances up to 150 parts, usually up to 100 parts, per 100 parts of the film-forming components and may be as low as several parts. The unpigmented composition can be used to provide clear coatings. For the primary utility as a white or tinted white appliance finish, the composition contains from 40 to 100 parts of titanium dioxide per 100 parts of the film-forming components. Other suitable pigments which may be used include metal oxides, hydrous metal oxides, chromates, silicates, sulfides, sulfates and carbonates, carbon blacks, organic dyestuffs and lakes thereof, and metal flake pigments, e.g. aluminum. Use of strongly basic-reacting and acid-sensitive pigments is preferably avoided.

The pigment is dispersed in a solution of one or more of the essential film-forming companents, preferably in a medium which at least includes the reactive copolymer. Any remaining film-forming components, usually in solution, are blended with the pigment dispersion to complete the composition.

The coating compositions can be applied by any of the usual methods such as by spraying, roller-coating, dipping, brushing or flow-coating. The coatings can be applied to any heat-resistant substrate which withstands the temperatures required to cure the coatings. The coatings are primarily designed for application to metal substrates, especially ferrous sheet metal substrates which are treated for anti-corrosion protection, e.g., with acidic compositions which contain chromic acid and/or phosphoric acid. Other particularly useful substrates are zinc-coated metal and aluminum.

The applied coatings are baked by conventional methods to harden and insolubilize or cure them. Baking times and temperatures are not particularly critical, but in order to obtain the best results, curing is accomplished by heating for 15 to 30 minutes at a temperature in the range of 120° C. to 180° C. Adequate cure can be effected by heating for 5 to 10 minutes at a higher temperature of about 230° C. or by heating for about 60 minutes at a temperature as low as 100° C. The coating is applied at ordinary coating thickness of 1 to 2 mils when applied as a single coat finish. The coating composition can be used as self-priming, applying from 0.5 to about 1 mil as a priming first coat and from about 1 to 1.5 mils as the superimposed second coat. Ordinary primers can be used as the first coat, epoxy resin-based primer being preferred.

A particular advantage of the coating compositions of the present invention is that the cure can be effected by heating without the aid of special curing agents which ordinarily present stability problems.

The following examples are provided to illustrate the principles and practice of the invention, but its scope is not limited to the exact details of these illustrative examples. Unless otherwise indicated, the parts and percentages are given by weight.

*Example 1*

Esterified copolymer: Parts by wt.
First portion—
    Industrial xylol—10° _____ 2801
    Butanol _____ 736
Second portion—
    Styrene _____ 1222
    Methyl methacrylate _____ 610
    Ethyl acrylate _____ 1384
    Methacrylic acid _____ 503
    Tertiary butyl peracetate—75% in benzene__ 49
Third portion—
    1,2-butylene oxide _____ 410.4
    Triphenyl phosphite _____ 40
    High solvency petroleum naphtha ("Solvesso" 100) _____ 273.6
Fourth portion—
    Benzyltrimethylammonium hydroxide—40% in methanol _____ 41
Fifth portion—
    Butanol _____ 66
Sixth portion—
    Phosphoric acid—85% NF _____ 11
Seventh portion—
    Butanol _____ 66
Eight portion—
    Industrial xylol _____ 85.6
    Butanol _____ 21.4
                                          8320.0

The industrial xylol is characterized by a boiling range of 135° to 145° C. and an aniline point of −44° C. Commercially available 5° xylol can be used in lieu of the indicated 10° xylol.

The styrene monomer is rubber grade with at least 99.2% purity having a content of 10 to 15 p.p.m. of tertiary butyl catechol as inhibitor.

The methyl methacrylate monomer is at least 99.5% purity and contains 45 to 65 p.p.m. of hydroquinone as inhibitor.

The ethyl acrylate monomer has a content of about 0.02% of methyl ether of hydroquinone (MEHQ) as inhibitor.

The methacrylic acid monomer has a content of 250 p.p.m. of MEHQ as inhibitor.

The tertiary butyl peracetate polymerization catalyst is commercially available at a concentration of 75% in benzene.

The high solvency petroleum naphtha is characterized by a boiling range of 150° to 190° C. and an aniline point of about −28° C., e.g. "Solvesso" 100.

The first portion is charged into a polymerization reactor and heated to reflux temperature of about 120° C. The second portion components are charged into a weigh tank, the comonomers and the polymerization catalyst being blended. This blended second portion is added to the first portion at a uniform rate, continuously over a period of about three hours. The temperature of the reaction mixture is maintained sufficiently high to continue the reflux, usually at least 116° C. and refluxing is continued for about 2½ hours after completion of the monomer addition, i.e., a total polymerization period of about 5½ hours. The third portion is premixed and added continuously at a uniform rate over a ½ hour period to the copolymer solution resulting from the solution polymerization of the comonomers of the second portion after the copolymer solution is cooled to just below reflux temperature. Then the quaternary ammonium esterification catalyst, i.e., the fourth portion, is blended into the reaction mixture followed by the addition of the fifth portion as a rinse to insure complete addition of the catalyst. The reaction mixture, provided with an atmosphere of carbon dioxide, is heated to reflux and the esterification is continued until the esterification product is characterized by an acid number of about 15. The resulting solution of esterified copolymer is cooled to just below reflux temperature and then the orthophosphoric acid, i.e., the sixth portion, is blended into the solution followed by addition of the seventh portion as a rinse for the acid. The solution of esterified copolymer is heated to reflux and about 150 parts of distillate are removed therefrom. The copolymer solution is then cooled to below reflux temperature, the solvents of the eighth portion are added and blended therewith, and the solution product is cooled and filtered to remove the precipitated phosphoric acid salt of the esterification catalyst.

This product solution is characterized by a copolymer content of about 50% and a viscosity usually in the range of U to W Gardner-Holdt at 25° C. The esterified copolymer is characterized by an acid number of about 15 and by the following approximate composition per 100 parts by weight thereof:

Parts
Polymerized styrene units _____ 30
Polymerized methyl methacrylate units _____ 15
Polymerized ethyl acrylate units _____ 34
Polymerized methacrylic acid units _____ 12.4
Butylene oxide esterified _____ 8.6
                                                100.0

The esterified 1,2-butylene oxide provides about 18.9 parts of hydroxybutyl methacrylate units which require about 10.3 parts of polymerized methacrylic acid units, leaving a balance of about 2.1 parts of unesterified methacrylic acid units. The copolymer characterized by a relative viscosity of about 1.175 based on 0.50 gram of copolymer in 50 ml. of ethylenedichloride.

*Example 2*

Esterified copolymer: Parts by wt.
First portion—
    Industrial xylol—10° _____ 2783
    Butanol _____ 732
Second portion—
    Styrene _____ 810
    Ethyl acrylate _____ 2386
    Methacrylic acid _____ 500
    Tertiary butyl peracetate—75% in benzene _ 49
Third portion—
    1,2-butylene oxide _____ 407.9
    Triphenyl phosphite _____ 40
    High solvency petroleum naphtha _____ 266.7
Fourth portion—
    Benzyltrimethylammonium hydroxide—40% in methanol _____ 41
    Butanol _____ 66
Fifth portion—
    Phosphoric acid—85% NF _____ 11
    Butanol _____ 66
Sixth portion—
    Industrial xylol—10° _____ 89.1
    Butanol _____ 22.3
                                                8270.0

The respective comonomers, solvents and other components of the recipe are of the same specifications as indicated in Example 1. A significant difference is the absence of methyl methacrylate comonomer and an increased proportion of ethyl acrylate to provide a softer and more flexible copolymer. The respective polymerization and esterification conditions and processing technique are essentially the same as described in Example 1, but the total number of portions in the recipe are reduced to six by including the respective rinse portions of butanol indicated in Example 1 as part of the solution of the esterification catalyst and as part of the solution of orthophosphoric acid, i.e., the fourth and fifth portions respectively of Example 2. The esterification is continued until the esterified copolymer is characterized by an acid number of about 15. The resulting copolymer solution has a copolymer content of about 50% and is characterized by a viscosity of U to W Gardner-Holdt at 25° C. The esterified copolymer has the following composition per 100 parts thereof:

| | Parts |
|---|---|
| Polymerized styrene units | 20 |
| Polymerized ethyl acrylate units | 59 |
| Polymerized methacrylic acid units | 12.4 |
| Butylene oxide esterified | 8.6 |
| | 100.0 |

The esterified 1,2-butylene oxide provides about 18.9 parts of hydroxybutyl methacrylate units, the same as in Example 1 copolymer, leaving about 2.1 parts of methacrylic acid units in the copolymer unesterified.

Substitution of acrylic acid for methacrylic acid on an equivalent weight basis in the respective recipes of Example 1 and Example 2 provides comparable esterified copolymer products. Direct substitution of acrylic acid for methacrylic acid on an equal weight basis in these recipes results in a proportionately higher acid number unesterified copolymer which requires reaction with more 1,2-butylene oxide to arrive at the esterified copolymer having an acid number of about 15. On the other hand, by esterifying with the same amount of 1,2-butylene oxide, the esterified copolymer is characterized by a proportionately higher acid number.

*Example 3*

| Coating composition: | Parts by wt. |
|---|---|
| First portion (pigment dispersion)— | |
| Example 1 copolymer solution—50% | 104 |
| High solvency petroleum naphtha | 73 |
| Titanium dioxide pigment-rutile | 265 |
| Second portion (wax dispersion)— | |
| Example 1 copolymer solution—50% | 5.3 |
| Wax—Cardis #10 | 2.7 |
| Butanol | 9.8 |
| Third portion— | |
| Example 1 copolymer solution—50% | 303.8 |
| Epoxyhydroxy polyether resin solution—50% | 58.8 |
| Toluenesulfonamide/melamine - formaldehyde resin solution—60% in equal parts of xylol and butanol | 98.2 |
| Fourth portion— | |
| High solvency petroleum naphtha | 37.2 |
| Butanol | 37.2 |
| Pine oil | 2.0 |
| Polydimethylsiloxane solution—1% in xylol | 3.0 |
| | 1000.0 |

In the above formulation, the wax introduced as the second portion is not an essential ingredient. The indicated Cardis #10 wax may be replaced with other hydrocarbon waxes, ester waxes, polyethylene, or other well recognized agents which provide the cured finish with abrasion-resistant characteristics. The wax can be omitted entirely, but presence of the small proportion of wax is preferred. The epoxy resin solution consists of 50 parts of "Epon" 1001 in 25 parts of butanol and 25 parts of high solvency petroleum naphtha. This epoxy resin is characterized by a melting point of about 70° C., an epoxide equivalent weight of 450 to 525 and an esterification equivalent weight of about 145. The indicated toluenesulfonamide/melamine-formaldehyde resin solution is commercially available as "Resimene" 881. The essential organic film-forming components of this composition consist of:

| | Parts |
|---|---|
| Esterified copolymer | 70 |
| Epoxy condensate | 10 |
| Toluenesulfonamide/melamine-formaldehyde resin | 20 |
| | 100 |

The pigment proportion is about 90 parts per 100 parts of the organic film-forming materials.

The first portion is prepared by dispersing the pigment in the copolymer solution by ordinary dispersion techniques. Sand grinding by the method described in U.S. Patent 2,581,414 is particularly suitable, or pebble grinding for about 30,000 cycles is satisfactory with the ingredients in the proportions indicated. Other techniques can be used by appropriate alteration in the proportions of the ingredient of the grind portion. The second portion is prepared by pebble milling for about 30,000 cycles. This wax dispersion is usually blended with the first portion and then the ingredients of the third portion are blended with the resulting combined portions. These ingredients of the third portion may be premixed. The composition is completed by blending with the ingredients of the fourth portion.

*Example 4*

| Coating composition: | Parts by wt. |
|---|---|
| First portion— | |
| Example 2 copolymer solution—50% | 95 |
| Xylol—10° | 95 |
| Titanium dioxide pigment | 284 |
| Second portion— | |
| Example 1 copolymer solution—50% | 5.7 |
| Wax—Cardis #10 | 2.8 |
| Butanol | 10.4 |
| Third portion— | |
| Example 1 copolymer solution—50% | 139.2 |
| Example 2 copolymer solution—50% | 139.2 |
| Fourth portion— | |
| Epoxy condensate solution—50% | 47.4 |
| Benzoguanamine-formaldehyde resin solution—66% | 155.4 |
| Isopropanol | 12.9 |
| Toluol | 11 |
| Polydimethylsiloxane solution—1% | 2 |
| | 1000.0 |

Except for the Example 2 copolymer and the benzoguanamine-formaldehyde resin solution, the respective ingredients are the same as specified in Example 3. The benzoguanamine aminoplast resin solution is 66% in butanol.

Per 100 parts by weight thereof, the essential film-forming components consist of:

| | Parts |
|---|---|
| Example 1 copolymer | 23 |
| Example 2 copolymer | 37 |
| Epoxy condensate | 7.5 |
| Benzoguanamine-formaldehyde resin | 32.5 |
| | 100.0 |

The pigment proportion is 90 parts per 100 parts of these film-forming components.

The coating composition is prepared following the general procedure outlined for the preparation of the Example 3 composition.

*Example 5*

Coating composition: Parts by wt.
First portion—
  Example 1 copolymer solution—50% ..... 104
  High solvency petroleum naphtha ........ 73
  Titanium dioxide pigment ............... 265
Second portion—
  Example 1 copolymer solution—50% ..... 5.3
  Wax—Cardis #10 or Polymekon ......... 2.7
  Butanol ................................ 9.8
Third portion—
  Example 1 copolymer solution—50% ..... 272.7
  Epoxyhydroxy polyether resin solution—50% ............................. 58.8
  Benzoguanamine-formaldehyde resin solution—66% in butanol .................. 112.0
  Industrial xylol—10° ................... 44.3
  Triphenyl phosphite .................... 10.0
Fourth portion—
  High solvency petroleum naphtha ....... 22.4
  Butanol ................................ 15.0
  Pine oil ............................... 2
  Polydimethylsiloxane solution—1% in xylol . 3
                                           ——
                                         1000.0

The respective components are the same as defined for the compositions of Examples 3 and 4. This Example 5 composition contains an additional amount of triphenyl phosphite supplement to that introduced through the Example 1 copolymer composition. The presence of the phosphite ester provides color improvement, particularly when the enamel is cured by heating in a gas-fired oven. Preparation of the coating composition follows the same procedure as outlined for the preparation of the Example 3 coating composition.

Suitable comparable coating compositions are obtained when alkanol-modified melamine/formaldehyde coating resins are substituted in part or entirely for the content of toluene - sulfonamide - modified melamine/formaldehyde resin or the benzoguanamine/formaldehyde resin designated in the compositions of Examples 3 through 5. Alkanol-modified urea/formaldehyde resins can be substituted adequately for up to about one-half the content of the aminoplast coating resin. At this maximum proportion of substitution, the resulting cured finish begins to exhibit adverse effects in the form of decreased gloss and greater brittleness.

The respective coating compositions are applied to sheet metal of the type used in the fabrication of washing machines, dryers, refrigerators and freezers, the metal being anti-corrosion treated in the usual manner for the particular utility. For example, the Example 3 coating composition is applied at about 1.2 mils over an epoxy-modified primer applied at a thickness of about 0.7 mil, a typical useful primer having the composition defined by Example 1 in U.S. Patent 3,014,881. The composite finish of primer and Example 3 composition as topcoat is cured by heating for 20 minutes at about 160° C. Evaluation of the resulting finish by subjecting it to established specification tests for washing machine finishes shows that the invention coating is an outstanding candidate for this purpose. The cured finish is resistant to the abusive conditions to which the finish of a washing machine is subjected in ordinary use.

The composition of Example 3 is applied in two coats to the sheet metal to provide a total film thickness of about 1.5 mils without a special primer, i.e., the coating is used self-priming. The finish is cured as indicated above. The properties of this cured self-primed finish are comparable with those of the composite of primer plus the invention coating as topcoat.

In another series of tests, a sheet metal panel having the cured enamel of Example 3 thereon is repair-patched with the Example 3 coating composition, the repaired finish being cured by heating for 20 minutes at 150° C. The finish patches satisfactorily, with no adverse effects attributed to reoperation of the finishing schedule.

The Example 4 coating composition is applied to sheet steel as a single coat of about 1.5 mils and cured by heating for 20 minutes at 160° C. The resulting finish is subjected to specification tests designed for evaluation of refrigerator finishes and washing machine finishes. The cured finish of the Example 4 composition qualifies as an excellent one-coat finish for either refrigerators or washing machines. The outstanding performance qualifies this composition as a universal finish for appliances. The performance is also excellent over primers ordinarily used in two-coat finishing of such appliances.

The performance of the Example 5 coating composition is comparable to that of the Example 3 composition and is rated second best thereto. Presence of the additional triphenyl phosphite in the Example 5 composition provides a further advantage in color retention over that of Example 3 composition which contains a much smaller proportion of the triphenyl phosphite. This color differential is particularly significant in commercial finishing operations where gas-fired ovens usually have an adverse effect on the color.

These coatings formulated with the defined esterified copolymers having reactive pendant hydroxybutyl moieties and pendant carboxylic acid moieties in combination with epoxy condensates and aminoplast coating resins heat-cure without the aid of curing agents and in the absence of such curing agents which ordinarily have an adverse effect on package stability, the invention coatings are advantageously package-stable in the liquid state. They readily cure by heat alone to resistant finishes which have the performance requirements definitive of a coating particularly useful for finishing washing machines, dryers, refrigerators, freezers and like home appliances.

I claim:

1. A coating composition comprising
   (A) about 20–85%, by weight, of a polymer having pendant hydroxybutyl moieties and pendant carboxyl moieties, comprising
      (1) monovinyl monocyclic aromatic hydrocarbon units,
      (2) units of an ester of an α-mono-olefinically unsaturated carboxylic acid having a terminal methylene group and 3 or 4 carbon atoms with a saturated aliphatic monohydric alcohol composed of carbon, hydrogen and oxygen atoms, and
      (3) units of an α-mono-olefinically unsaturated carboxylic acid having a terminal methylene group, the polymer having a hydroxybutyl ester unit content of about 10–40%, by weight, and an acid number of about 5–30;
   (B) about 3–30%, by weight, of an expoxyhydroxy polyether condensate having, per molecule, a plurality of vic-epoxy moieties and at least one hydroxyl group joined to an aliphatic carbon atom;
   (C) about 10–50% of an aminoplast resin of formaldehyde condensed with melamine, toluene-sulfonamide modified melamine, benzoguanamine or urea; and
   (D) an organic liquid.

2. The composition of claim 1 containing pigment.

3. A coating composition comprising
   (A) a film-forming component which comprises
      (1) about 50–80%, by weight, of a polymer having pendant hydroxybutyl moieties and pendant carboxyl moieties, comprising
         (a) styrene units
         (b) units of an ester of an α-mono-olefinically unsaturated carboxylic acid having a terminal methylene group and 3 or 4 carbon atoms with an alkanol of 1–6 carbon atoms, and
    (c) methacrylic acid units, the polymer having a hydroxybutyl ester content of about 15–30%, by weight, and an acid number of about 5–30;
(2) about 5–20%, by weight, of an epoxyhydroxy polyether condensate prepared by condensing an epihalohydrin with a polyhydroxy compound under alkaline conditions; and
(3) about 15–30%, by weight, of an aminoplast resin of formaldehyde condensed with toluenesulfonamide modified melamine;
(B) about 40–100 parts per 100 parts of the film-forming component of titanium dioxide; and
(C) a liquid comprising an aromatic hydrocarbon and a lower saturated aliphatic monohydric alcohol.

4. The composition of claim 3 in which component (b) of the polymer comprises ethyl acrylate and methyl methacrylate in an acrylate/methacrylate ratio of 0.5–4/1.

References Cited

UNITED STATES PATENTS

| | | | |
|---|---|---|---|
| 2,662,870 | 12/1953 | Allenby | 260—45.5 |
| 2,842,519 | 7/1958 | Ripley-Duggan | 260—45.5 |
| 2,848,433 | 8/1958 | Eirich | 260—45.5 |
| 2,961,424 | 11/1960 | Mueller et al. | 260—45.2 |
| 3,002,959 | 10/1961 | Hicks | 260—85.7 |
| 3,014,881 | 12/1961 | La Barre | 260—45.2 |
| 3,056,764 | 10/1962 | Graham et al. | 260—80.5 |

MORRIS LIEBMAN, *Primary Examiner.*

J. W. BEHRINGER, J. H. DERRINGTON,
                                  *Assistant Examiners.*